United States Patent
Fresch et al.

(10) Patent No.: US 12,311,626 B2
(45) Date of Patent: May 27, 2025

(54) PROCESS FOR THE MANUFACTURE OF A MULTI-COMPOUND TREAD FOR PNEUMATIC TIRES FOR ROAD VEHICLES

(71) Applicant: Bridgestone Europe NV/SA [BE/BE], Zaventem (BE)

(72) Inventors: Enrico Fresch, Rome (IT); Alessandra Bartoloni, Rome (IT); Andrea Sabella, Rome (IT)

(73) Assignee: Bridgestone Europe NV/SA, Zaventem (BE)

( * ) Notice: Subject to any disclaimer, the term of this patent is extended or adjusted under 35 U.S.C. 154(b) by 349 days.

(21) Appl. No.: 17/795,613

(22) PCT Filed: Jan. 26, 2021

(86) PCT No.: PCT/IB2021/050579
§ 371 (c)(1),
(2) Date: Jul. 27, 2022

(87) PCT Pub. No.: WO2021/152452
PCT Pub. Date: Aug. 5, 2021

(65) Prior Publication Data
US 2023/0078465 A1    Mar. 16, 2023

(30) Foreign Application Priority Data

Jan. 28, 2020 (IT) .......................... 102020000001612

(51) Int. Cl.
*B29D 30/52* (2006.01)
*B60C 11/00* (2006.01)

(52) U.S. Cl.
CPC .......... *B29D 30/52* (2013.01); *B60C 11/0008* (2013.01); *B60C 11/005* (2013.01); *B60C 2011/0025* (2013.01)

(58) Field of Classification Search
CPC ............... B60C 11/0008; B60C 11/005; B60C 2011/0025; B29D 30/52; B29C 48/0022; B29C 48/022
(Continued)

(56) References Cited

U.S. PATENT DOCUMENTS 2,672,910 A * 3/1954 Corson ................... B60C 11/14
152/209.4
7,249,621 B2   7/2007 Sandstrom
(Continued)

FOREIGN PATENT DOCUMENTS

CA    2021668 A1 * 1/1991
EP    1458536 B1 * 2/2008 ............. B29B 7/007
(Continued)

*Primary Examiner* — Sedef E Paquette
(74) *Attorney, Agent, or Firm* — Patterson Intellectual Property Law, PC

(57) ABSTRACT

A process for the manufacture of a tread band for pneumatic tyres, wherein the blocks thereof comprise different rubber portions characterized by a different hysteresis loss. The process comprises a shredding step, wherein from a first and from a second rubber tread compound a plurality of fragments is manufactured with dimensions of between 6 and 30 mesh; a mixing step, wherein the fragments from the first and second compound are mixed together in order to obtain a mixture wherein the fragments are distributed in a random manner and retain their chemical/physical individuality; and an extrusion step, wherein the mixture from the preceding step is extruded for the manufacture of the tread band. The first and second compounds have different dynamic properties in terms of: dynamic modulus at 30° C., tanδ at 0° C., tanδ at 30° C. and tanδ at 60° C. The fragments retain a chemical/physical individuality both within the mixture formed during the mixing step and within the tread band formed during the extrusion step.

8 Claims, 3 Drawing Sheets

Figure 1:
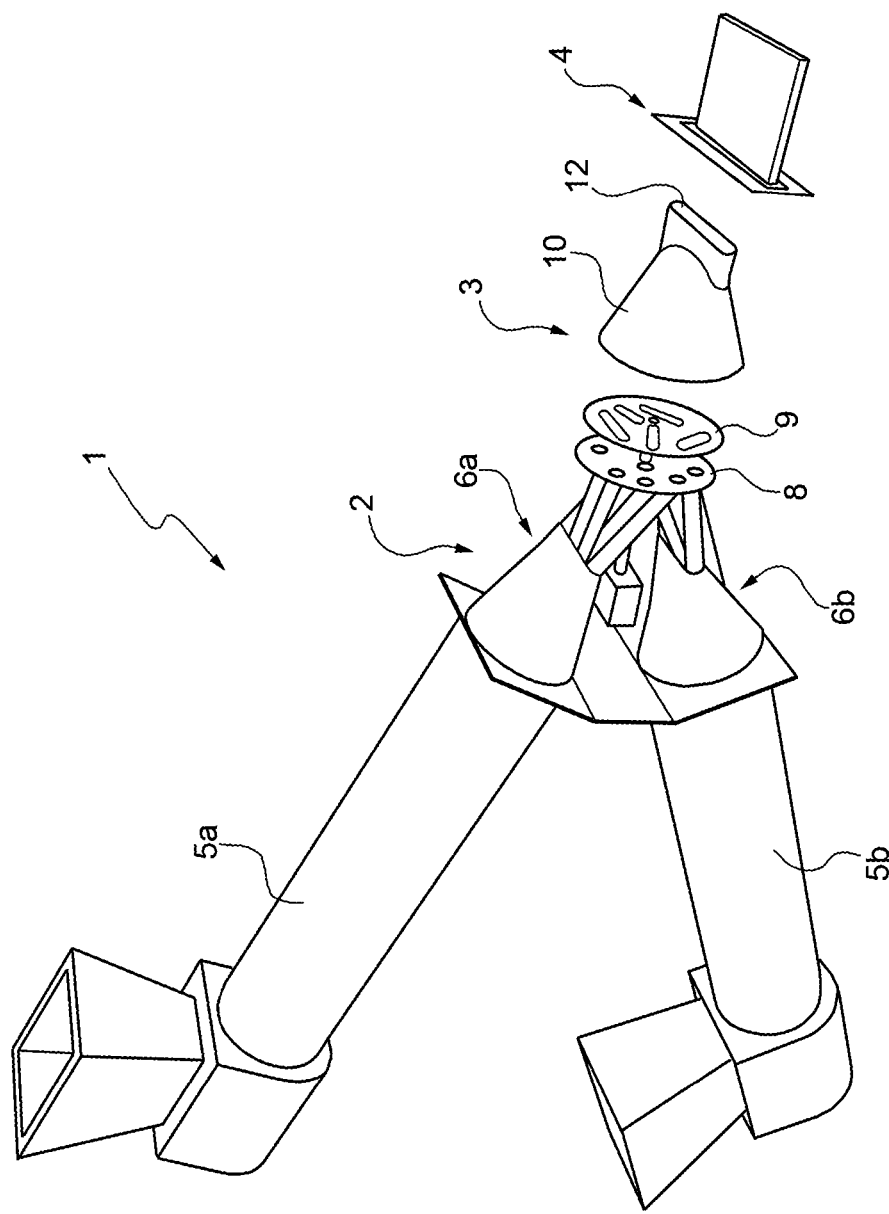

(58) Field of Classification Search
USPC .................................... 152/209.5; 156/110.1
See application file for complete search history.

(56) References Cited

U.S. PATENT DOCUMENTS

| | | | |
|---|---|---|---|
| 2005/0040555 A1* | 2/2005 | Caretta | B29C 48/37 |
| | | | 264/211.21 |
| 2017/0361555 A1 | 12/2017 | Prandini et al. | |
| 2018/0147769 A1* | 5/2018 | Reineke | B29C 48/307 |
| 2021/0039295 A1* | 2/2021 | Reineke | B29C 48/2556 |

FOREIGN PATENT DOCUMENTS

| | | | |
|---|---|---|---|
| EP | 2995436 A1 | | 3/2016 |
| WO | WO 1995002011 A1 * | | 1/1995 |

* cited by examiner bow
PROCESS FOR THE MANUFACTURE OF A MULTI-COMPOUND TREAD FOR PNEUMATIC TIRES FOR ROAD VEHICLES The present invention relates to a process and to a plant for the manufacture of a multi-compound tread for pneumatic tires or road vehicles. In particular, the present invention relates to a process and to a plant for the manufacture of a tread wherein the blocks thereof comprise portions made using different compounds.

In the field of pneumatic tires for road vehicles, it is known that low rolling resistance and good wet grip performance are characteristics that are difficult to reconcile within the same tread. In fact, whilst in order to confer good rolling resistance to a pneumatic tire treads that are manufactured with compounds with a low hysteresis loss are used, in order to confer good wet grip performance to a pneumatic tire compounds having a higher hysteresis loss become necessary.

Consequently, an optimal tread compound for simultaneously enhancing all dynamic responses should exhibit opposing hysteresis characteristics, at least over certain required performance limits.

It is known that the properties of the aforementioned rubber compound influence not only the balance between wet grip performance/rolling resistance, but also other performance of the pneumatic, tire such as the balance between winter/wet grip performance.

As is known, the tread is composed of a plurality of blocks, which are elements that are delimited by a plurality of grooves that are formed within the tread. These grooves may have differing dimensions depending upon the function that they must fulfill. For example, when the grooves have a reduced width they are called platelets or sipes and are intended to provide greater grip on snow and ice.

In other words, a tread block is a rubber filled portion bounded by a plurality of grooves, independently of whatever the dimensions of the latter may be.

The inventors of the present invention have found that, if the blocks of the tread are composed of different portions manufactured with respective compounds having differing hysteresis losses, it is possible to obtain a synergistic effect that is capable of imparting significant improvements in terms of wet grip performance, without thereby adversely affect the rolling resistance.

The inventors of the present invention have effected a process and an associated plant in order to be able to manufacture, in an effective and productive manner, a tread comprising blocks composed of different portions having differing hysteresis losses.

The object of the present invention is a process for the manufacture of a tread band for pneumatic tires wherein the blocks thereof comprise different rubber portions characterized by a different hysteresis loss; said process being characterized in that it comprises a die-cut step, wherein from a first and from a second rubber tread compound a plurality of fragments is produced with dimensions of between 6 and 30 mesh; a mixing step wherein the fragments from said first and said second compound are mixed together in order to obtain a mixture wherein said fragments are distributed in a random manner and retain their chemical/physical individuality thereof; and an extrusion step, wherein the mixture from the preceding step is extruded for the manufacture of said tread band wherein said fragments from, respectively, said first and said second compound are distributed randomly and retain the chemical/physical individuality thereof; said first and said second compounds having different dynamic properties in terms of: dynamic modulus at 30° C., tanδ at 0° C., tanδ at 30° C. and tanδ at 60° C.

Here and hereinafter, the term rubber compound refers to a mixture comprising at least one cross-linkable unsaturated chain, a filler and a vulcanization system. In other words, rubber compounds are mixtures capable of producing a vulcanized rubber portion that can be used, per se, in the production of portions of pneumatic tires. Here and hereinafter, the term "chemical/physical individuality" means that the individual fragments in the mixture that is formed during the mixing step and in the tread band that is formed during the extrusion step retain the chemical and physical characteristics of the rubber compound wherefrom they originate and, therefore, they are not fused together.

In other words, both in the mixture and the tread band, the different fragments from both compounds are found to be joined to one another in a random manner without, however, merging with one another.

Preferably, said first compound has a dynamic modulus at 30° C. of between 11.0 and 17.0 MPa, a tanδ at 0° C. of between 0.85 and 1.1, a tanδ at 30° C. of between 0.45 and 0.65 and a tanδ at 60° C. of between 0.19 and 0.30; said second compound having a dynamic modulus at 30° C. of between 5.5 and 15 MPa and less than that of said first compound by at least 2 MPa, a tanδ at 0° C. of between 0.70 and 0.99 and less than that of said first compound by at least 0.02, a tanδ at 30° C. of between 0.21 and 0.63 and less than that of said first compound by at least 0.02, a tanδ at 60° C. between 0.10 and 0.28 and less than that of said first compound by at least 0.02.

The dynamic properties were measured in accordance with the ISO 4664 standard. As is known to a person skilled in the art, the tanδ values at 60° C. are strictly correlated to the property of rolling resistance: the lower the tanδ value at 60° C., the better the rolling resistance.

Preferably, said shredding step comprises an extrusion operation for said first and said second compound, and a cutting operation for the extrusions of said first and second compounds.

Preferably, said mixing step and said extrusion step are actuated by the thrust deriving from the extrusion operation included in the die-cutting step.

A further object of the present invention is a tread band manufactured using the process, the object of the present invention.

A further object of the present invention is a plant for the manufacture of a tread band, wherein the blocks thereof comprise different rubber portions characterized by a different hysteresis loss; said plant being characterized in that it comprises a shredding step, wherein from a first and from a second rubber tread compound a plurality of fragments is produced with dimensions of between 6 and 30 mesh; a mixing station wherein the fragments from said first and said second compound are mixed together in order to obtain a mixture wherein said fragments are distributed in a random manner and retain their chemical/physical individuality; and an extrusion station, wherein the mixture from the preceding step is extruded for the manufacture of said tread band, wherein said fragments from said first and said second compound are distributed randomly and retain the chemical/physical individuality thereof.

Preferably, said shredding station comprises two extruders operating in parallel and wherein, into each thereof, a first and a second compound is respectively loaded; each of said extruders comprising a multiple extruder mouth made of a plurality of outflow tubes and a rotary die whereto the respective free ends of the outflow tubes face and being suitable for implementing shredding for the production of said fragments.

Preferably, said mixing station comprises a mixing chamber having a rotary die connected to said inlet opening and an extrusion station connected to said outlet opening.

Preferably, said mixing chamber has a substantially truncated cone conformation wherein, upon a larger base thereof, said inlet opening is formed and upon a smaller base thereof, said outlet opening is formed.

Figure 2:
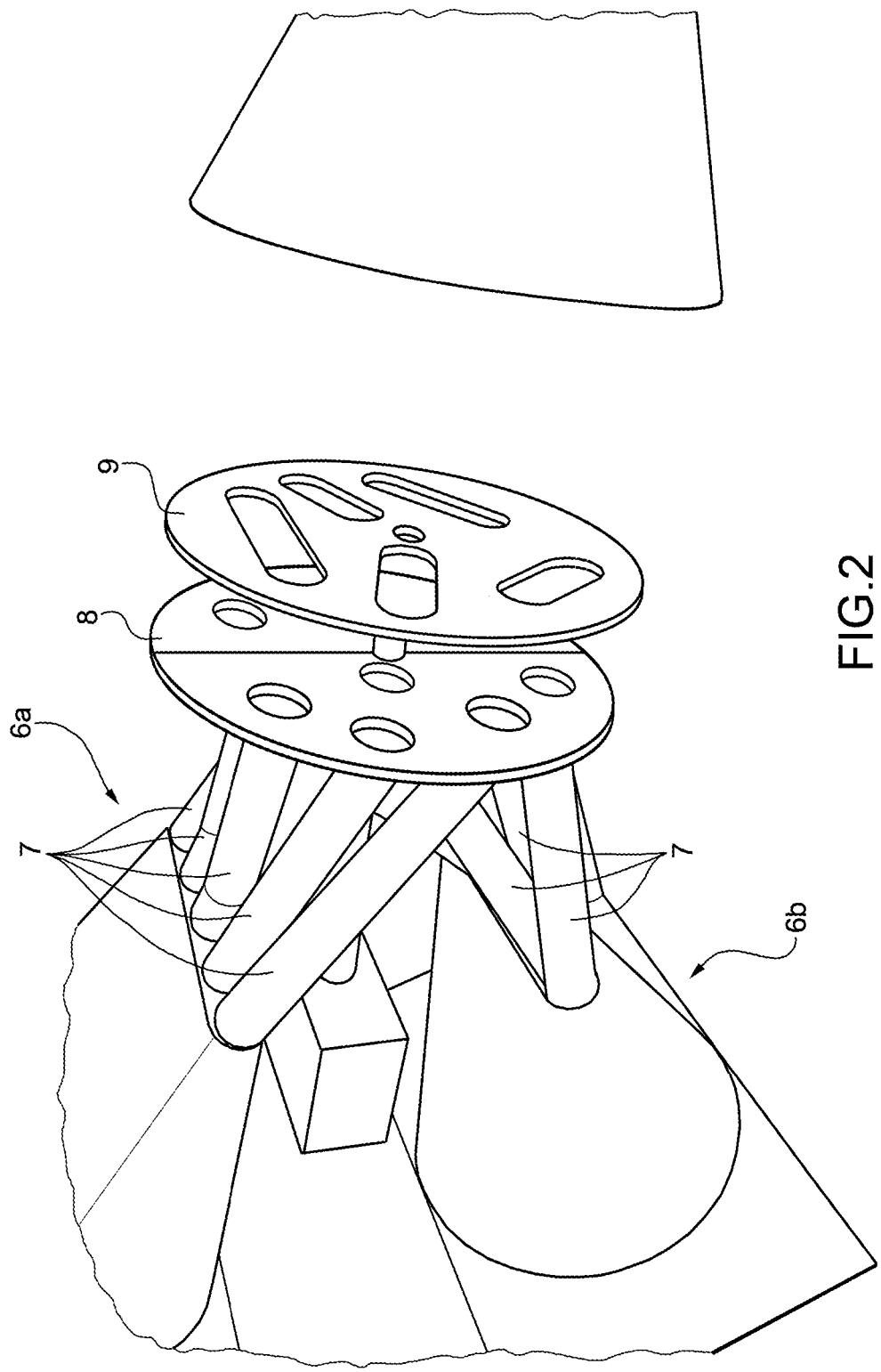
Figure 3:
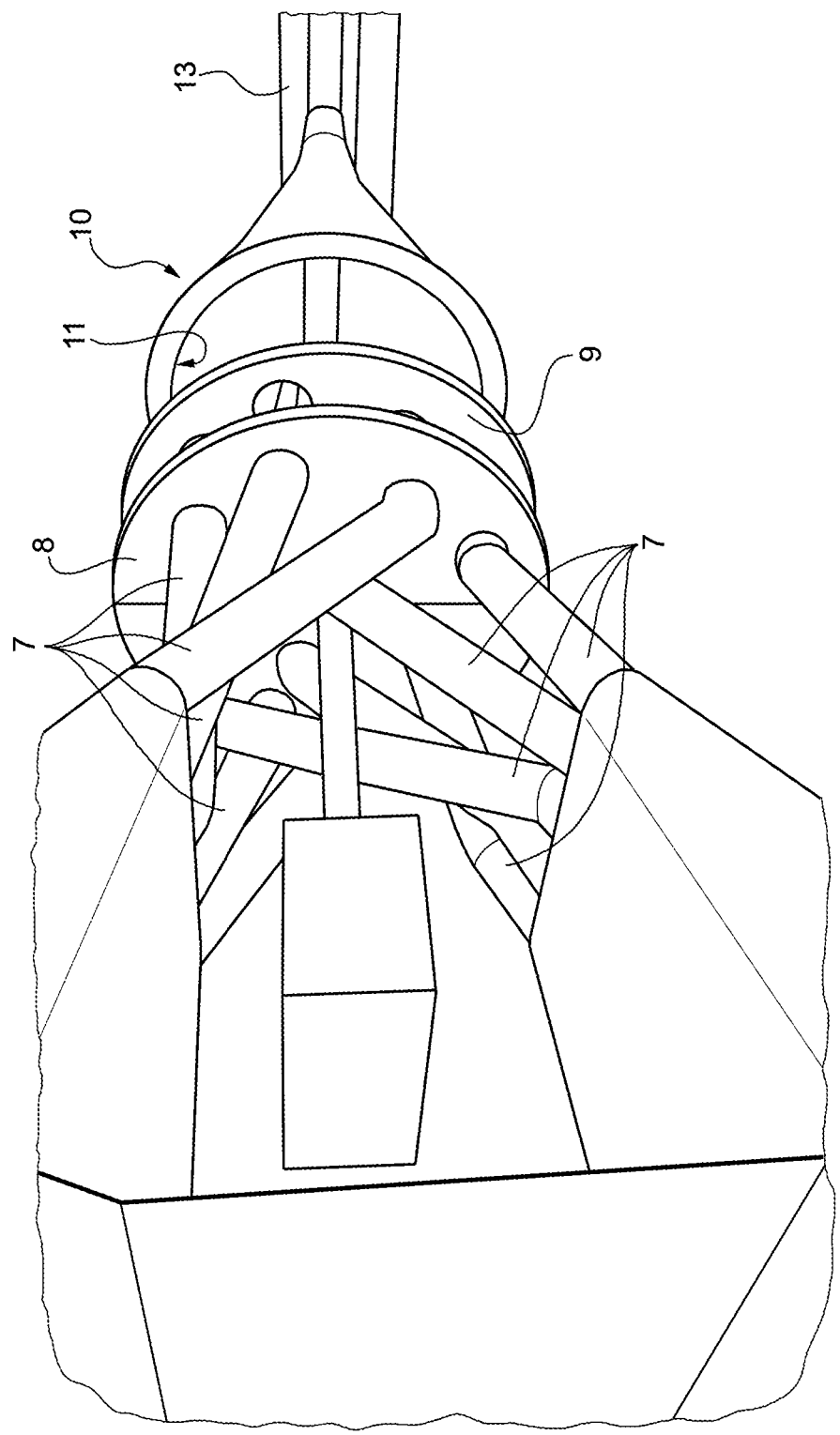

Below an exemplary, non-limiting embodiment of the present invention is given for illustrative purposes, with the aid of the accompanying figures, wherein:

FIG. 1 is a perspective view in exploded form of the plant according to the present invention; and FIGS. 2 and 3 show, in exploded form, and from two different angles, an enlarged detail of the plant of FIG. 1.

In FIG. 1, the plant, the object of the present invention, is indicated in the entirety thereof with 1.

The plant 1 comprises a shredding station 2, a mixing station 3 and an extrusion station 4.

The shredding station 2 comprises two extruders 5a and 5b, which are loaded, through the hoppers thereof, respectively, with a first and a second tread compound. The two compounds have differing dynamic properties in terms of: dynamic modulus at 30° C., tanδ at 0° C., tanδ at 30° C. and tanδ at 60° C.

Table I gives the compositions of the first and second rubber compounds used.

TABLE I

|  |  | FIRST COMPOUND | SECOND COMPOUND |
|---|---|---|---|
| POLYMERIC BASE WITH OIL | S-SBR | 100.0 | 80.0 |
|  | E-SBR | 0 | 20.0 |
| FILLER | SILICA | 70.0 | 80.0 |
|  | CARBON BLACK | 10.0 | 5.0 |
| BINDER AGENT | SILANE | 7.0 | 7.0 |
|  | MICROCRYS-TALLINE WAX | 8.0 | 8.0 |
|  | STEARIC ACID | 1.0 | 1.0 |
|  | AROMATIC OIL | 4.0 | 4.0 |
| Vulcanization agents | ZINC OXIDE | 2.0 | 2.0 |
|  | SULFUR | 1.0 | 1.5 |
|  | MBTS | 1.0 | 1.2 |
|  | DPG | 1.5 | 1.8 |
|  | DRY POLYMERIC BASE | 100 | 100 |

E-SBR is a polymeric base obtained by means of an emulsion polymerization process with an average molecular weight of between $800\text{-}1500 \times 10^3$ and $500\text{-}900 \times 10^3$, respectively, with a styrene content of between 20 and 45% and used with an oil content of between 0 and 30%.

S-SBR is a polymeric base obtained by means of a solution polymerization process with an average molecular weight of between $800\text{-}1500 \times 10^3$ and $500\text{-}900 \times 10^3$, respectively, with a styrene content of between 20 and 45%.

The silica used is marketed under the name ULTRASIL VN3 by the DEGUSSA company.

The carbon black used is marketed under the name Vulcan 7H (N234) by the CABOT company.

The silane used is marketed under the name SI 69 by the DEGUSSA company.

MBTS is the abbreviation of the compound mercaptobenzothiazole disulfide which functions as a vulcanization accelerator; DPG is the acronym of the compound diphenylguanidine which functions as a vulcanization accelerator.

The first and the second compounds have a dynamic modulus at 30° C., respectively, of 14.4 and 9.4 MPa, a tanδ at 0° C., respectively, of 0.980 and 0.810, a tanδ at 30° C., respectively, of 0.532 and 0.238 and a tanδ at 60° C., respectively, of 0.220 and 0.124.

Both extruders 5a and 5b have a multiple extrusion mouth 6a and 6b comprising a plurality of tubes 7, wherein the free ends thereof are blocked within respective circular openings formed within a single support plate 8.

The shredding station 2 comprises a rotary die 9, wherein a plurality of openings is formed in order to allow for the die-cutting of the extruded compounds.

The extruded compounds, once they pass through the rotary die 9, are in fact cut by the action of the rotation of the rotary die 9 itself.

The extrusion speed of the extruders 5a and 5b and the speed of rotation of the rotary die 9 are set in order to obtain fragments with dimensions of between 6 and 30 mesh.

In FIGS. 2 and 3, the multiple extrusion mouths 6a and 6b are described in detail from two different angles together with the plurality of the tubes 7, the support plate 8 and the rotary die 9.

The mixing station 3 comprises a mixing chamber 10, of a substantially truncated cone shape, wherein the larger base thereof defines an inlet opening 11 connected to the rotary die 9, and wherein the smaller base thereof defines an outlet opening 12 connected to the extrusion station 4.

The fragments, once produced by the action of the rotary die 9, enter the mixing chamber 10 where, by virtue also of the shape of the mixing chamber 10 itself, they are mixed together thereby producing a new compound wherein, however, each fragment maintains its own chemical/physical individuality.

The fact that the different fragments retain their chemical/physical individuality is extremely important in ensuring the effectiveness of the invention.

In fact, only if the different fragments do not fuse together but retain their individuality is it possible to produce a tread band wherein the blocks thereof are composed of parts with differing hysteresis losses and with the advantages that this entails in terms of rolling resistance and wet grip.

Finally, the extrusion station 4 comprises an extrusion outlet 13 connected directly to the outlet opening 12 of the mixing chamber 10. The tread band emerges from the extrusion outlet 13 and is then combined with those other parts of the pneumatic tire that are then to be subjected to a vulcanization step.

From the description above it is apparent that the mixing within the mixing chamber 10 and the extrusion through the extrusion outlet 13 take place due to the thrust deriving from the action of the two extruders 5a and 5b.

As mentioned above, the method and plant of the present invention ensure the preparation of a tread band, wherein the blocks thereof are composed of the random combination of a plurality of portions with differing hysteresis losses.

In particular, it should be noted that the process and the plant of the present invention ensure the effective, high-throughput preparation of the aforementioned tread band.

In this way it will be possible to produce a tread band wherein the technical characteristics thereof are such as to ensure significant improvement effects in terms of wet grip performance, maintaining, at the same time, the advantages obtained in terms of rolling resistance.

The invention claimed is:

1. A method for manufacturing a tread band for pneumatic tires wherein blocks thereof comprise portions with differing hysteresis losses, the method comprising:
shredding a first rubber tread compound and a second rubber tread compound to produce a plurality of fragments of the first rubber tread compound and a plurality of fragments of the second rubber tread compound with dimensions of between 6 and 30 mesh;
mixing the plurality of fragments of the first rubber tread compound together with the plurality of fragments of the second rubber tread compound to obtain a mixture wherein said fragments are distributed in a random manner and retain their chemical/physical individuality in the tread band and are joined to one another without merging; and
extruding the mixture from the mixing step to form the tread band wherein said fragments from, respectively, said first rubber tread compound and said second rubber tread compound are distributed randomly and retain their chemical/physical individuality in the tread band and are joined to one another without merging;
and wherein said first rubber tread compound and said second rubber tread compound have different dynamic properties with respect to each of: dynamic modulus at 30° C.; tan δ at °0 C; tan δ at 30° C.; and tan δ at 60° C.;
wherein the first rubber tread compound comprises a rubber component of 100 parts per hundred (phr) S-SBR, and the second rubber tread compound comprises a rubber component of 80 phr S-SBR and 20 phr E-SBR.

2. The method of claim 1, wherein:
said first rubber tread compound has a dynamic modulus at 30° C. of between 11.0 and 17.0 MPa, a tan δ at 0° C. of between 0.85 and 1.1, a tan δ at 30° C. of between 0.45 and 0.65, and a tan δ at 60° C. of between 0.19 and 0.30;
said second rubber tread compound has a dynamic modulus at 30° C. of between 5.5 and 15 MPa and less than that of said first rubber tread compound by at least 2 MPa, a tan δ at 0° C. of between 0.70 and 0.99 and less than that of said first rubber tread compound by at least 0.02, a tan δ at 30° C. of between 0.21 and 0.63 and less than that of said first rubber tread compound by at least 0.02, and a tan δ at 60° C. between 0.10 and 0.28 and less than that of said first rubber tread compound by at least 0.02.

3. The method of claim 1, wherein said shredding step comprises an extrusion operation for said first rubber tread compound and said second rubber tread compound, and a die-cutting operation for the extrusions of said first rubber tread compound and said second rubber tread compound.

4. The method of claim 3, wherein said mixing step and said extrusion step are actuated by a thrust deriving from the extrusion operation associated with the die-cutting operation.

5. A tread band for pneumatic tires wherein blocks thereof comprise portions with differing hysteresis losses, manufactured by:
shredding a first rubber tread compound and a second rubber tread compound to produce a plurality of fragments of the first rubber tread compound and a plurality of fragments of the second rubber tread compound with dimensions of between 6 and 30 mesh;
mixing the plurality of fragments of the first rubber tread compound together with the plurality of fragments of the second rubber tread compound to obtain a mixture wherein said fragments are distributed in a random manner and retain their chemical/physical individuality in the tread band and are joined to one another without merging; and
extruding the mixture from the mixing step to form the tread band wherein said fragments from, respectively, said first rubber tread compound and said second rubber tread compound are distributed randomly and retain their chemical/physical individuality in the tread band and are joined to one another without merging;
wherein said first rubber tread compound and said second rubber tread compound have different dynamic properties with respect to each of: dynamic modulus at 30° C.; tan δ at 30° C.; tan δ at 30° C.; and tan δ at 60° C.;
and wherein the first rubber tread compound comprises a rubber component of 100 parts per hundred (phr)S-SBR, and the second rubber tread compound comprises a rubber component of 80 phr S-SBR and 20 phr E-SBR.

6. The tread band of claim 5, wherein:
said first rubber tread compound has a dynamic modulus at 30° C. of between 11.0 and 17.0 MPa, a tan δ at 0° C. of between 0.85 and 1.1, a tan δ at 30° C. of between 0.45 and 0.65 and a tan δ at 60° C. of between 0.19 and 0.30; and
said second rubber tread compound has a dynamic modulus at 30° C. of between 5.5 and 15 MPa and less than that of said first rubber tread compound by at least 2 MPa, a tan δ at 0° C. of between 0.70 and 0.99 and less than that of said first rubber tread compound by at least 0.02, a tan δ at 30° C. of between 0.21 and 0.63 and less than that of said first rubber tread compound by at least 0.02, a tan δ at 60° C. between 0.10 and 0.28 and less than that of said first rubber tread compound by at least 0.02.

7. The tread band of claim 5, wherein the shredding step comprises an extrusion operation for said first rubber tread compound and said second rubber tread compound, and a die-cutting operation for the extrusions of said first rubber tread compound and said second rubber tread compound.

8. The tread band of claim 7, wherein said mixing step and said extrusion step are actuated by a thrust deriving from the extrusion operation associated with the die-cutting operation.

* * * * *